US011625567B2

(12) United States Patent
Cardwell

(10) Patent No.: US 11,625,567 B2
(45) Date of Patent: Apr. 11, 2023

(54) CONDUIT WITH RADIO FREQUENCY IDENTIFICATION (RFID) ENABLED SENSOR

(71) Applicant: Cooper-Standard Automotive Inc., Northville, MI (US)

(72) Inventor: Brian James Cardwell, Ypsilanti, MI (US)

(73) Assignee: Cooper-Standard Automotive Inc., Northville, MI (US)

( * ) Notice: Subject to any disclaimer, the term of this patent is extended or adjusted under 35 U.S.C. 154(b) by 149 days.

(21) Appl. No.: 17/236,507

(22) Filed: Apr. 21, 2021

(65) Prior Publication Data

US 2022/0343127 A1 Oct. 27, 2022

(51) Int. Cl.
*G06K 19/07* (2006.01)
*F16L 37/098* (2006.01)

(52) U.S. Cl.
CPC ...... *G06K 19/0723* (2013.01); *F16L 37/0985* (2013.01); *G06K 19/0716* (2013.01); *F16L 2201/10* (2013.01)

(58) Field of Classification Search
CPC .......... G06K 19/0723; G06K 19/0716; G06K 19/07; G06K 19/0707; F16L 37/0985; F16L 2201/10
See application file for complete search history.

(56) References Cited

U.S. PATENT DOCUMENTS

| 10,295,500 | B2 | 5/2019 | Makin et al. |
| 10,690,277 | B2 | 6/2020 | Fremont |
| 2010/0174495 | A1 | 7/2010 | Pereira et al. |
| 2017/0089496 | A1* | 3/2017 | Lennon ................. F16L 13/146 |
| 2019/0005368 | A1* | 1/2019 | Lektomiller ..... G06K 19/07773 |
| 2019/0095769 | A1* | 3/2019 | Lektomiller ....... G06K 19/0709 |
| 2020/0235608 | A1 | 7/2020 | Lafayette et al. |

FOREIGN PATENT DOCUMENTS

WO 2019005043 A1 1/2019

OTHER PUBLICATIONS

Hannes Reinisch, "A Multifrequency Passive Sensing Tag With On-Chip Temperature Sensor and Off-Chip Sensor Interface Using EPC HF and UHF RFID Technology", Dec. 1, 2011, Publisher: IEEE Journal of Solid-State Circuts.
"Search Report for EP22168979.7", dated Sep. 14, 2022.

* cited by examiner

*Primary Examiner* — Sisay Yacob
(74) *Attorney, Agent, or Firm* — Paschall & Associates, LLC; James C. Paschall

(57) ABSTRACT

A system for sensing a physical property of a medium inside a conduit includes a radio frequency identification (RFID) reader arranged to transmit electromagnetic signals in at least one radio frequency. An RFID tag receives the least one radio frequency and exchanges the received radio frequency to electrical energy powering the RFID tag. An included sensor electrically connected to the RFID tag receives the electrical energy from the RFID tag and powers the sensor to obtain measurement data of at least one physical property of the medium and transmit the measurement data to the RFID tag. The RFID tag transmits the measurement data to the RFID reader using the at least one radio frequency.

20 Claims, 3 Drawing Sheets

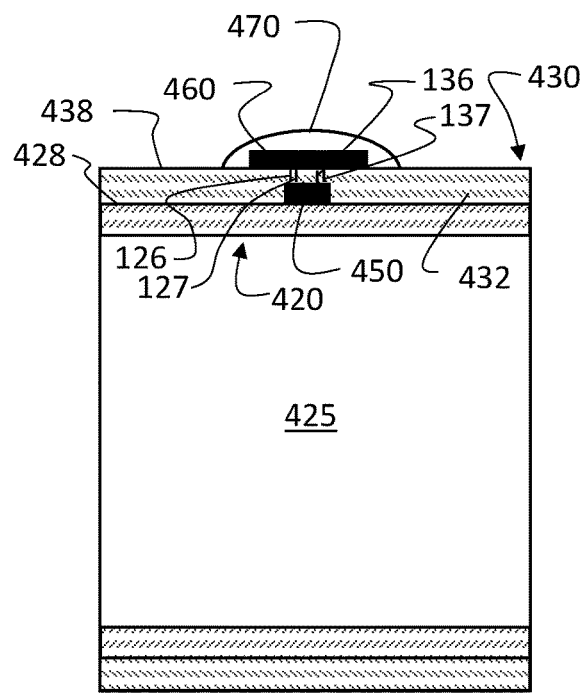
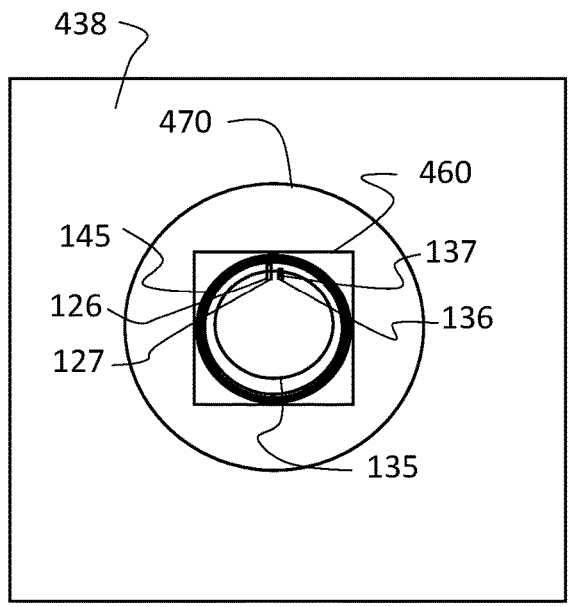
FIG. 4    FIG. 4A
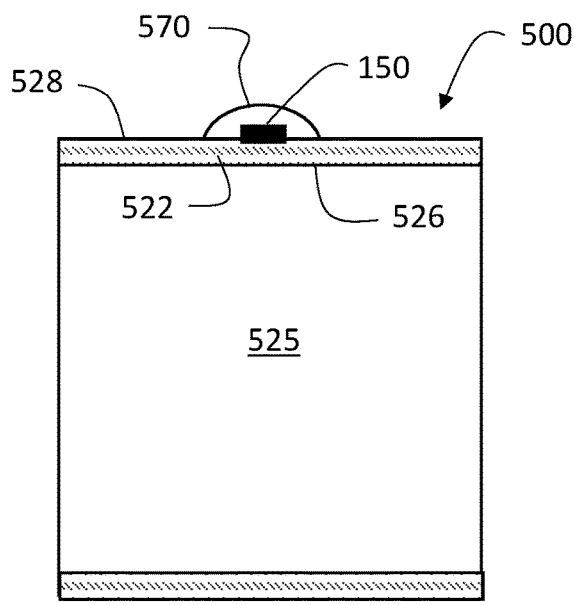
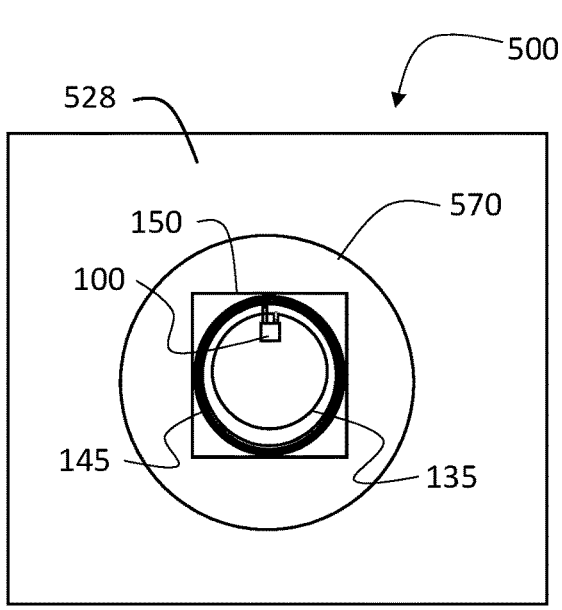
FIG. 5    FIG. 5A

CONDUIT WITH RADIO FREQUENCY IDENTIFICATION (RFID) ENABLED SENSOR

TECHNICAL FIELD

This disclosure is generally directed to a conduit having a radio frequency identification (RFID) enabled sensor. More specifically, it relates to a system that uses an RFID enabled sensor to sense a physical property of a medium inside a conduit and report the sensed physical property using an RFID communication protocol.

BACKGROUND

There is a need in fluid handling applications to sense various aspects of the physical or chemical properties of the fluid being conveyed in a conduit or the physical state of the conduits or connectors. These properties include (but are not limited to) items like temperature, pressure, flow rate, presence of leaks, etc. It is also desirable in automotive applications to monitor the physical states of the conduits or connectors for abrasion or wear that may lead to leaks or failures. Frequently, some part of the conduit or connector is not easily accessible after installation or otherwise difficult or inconvenient to measure. Additionally, it is not always possible or convenient and economical to route power or signal wires to the location within the vehicle structure where a sensor or its associated conduit is located. Therefore, it becomes desirable to use a wireless interface with measurement sensor circuits. A wireless interface would allow measurement to be made without the need for a physical electrical contact with the sensor.

Radio-Frequency Identification (RFID) technology has become widely used in virtually every industry, including transportation and manufacturing. A typical RFID System includes an RFID tag, and at least one RFID reader or detection system having an antenna for communication with the RFID tag, and a computing device to control the RFID reader. The RFID reader includes a transmitter that may provide energy or information to the RFID tag, and a receiver to receive identity and other information from the tag. The computing device processes the information obtained by the RFID reader.

In general, the information received from an RFID tag is specific to the particular application, but often provides an identification for an article to which the tag is fixed. Exemplary articles include manufactured items or information to tangible articles. Additional information may also be provided for the article. The tag may be used during a manufacturing process, for example, to indicate a paint color of an automobile chassis during manufacturing or other useful information. The transmitter of the RFID reader outputs radio frequency signals through an antenna to create an electromagnetic field that enables the RFID tags to return an RF signal carrying the information. In some configurations, the transmitter initiates communication, and makes use of an amplifier to drive the antenna with a modulated output signal to communicate with the RFID tag. In other configurations, the RFID tag receives a continuous wave signal from the RFID reader and initiates communication by responding immediately with its information.

The RFID tags communicate using a pre-defined protocol, allowing the RFID reader to receive information from one or more tags. The computing device may serve as an information management system by receiving the information from the RFID reader and performing some action, such as, presenting information to a user or storing a measurement in a database.

It would be therefore beneficial in certain applications to have sensors that monitor fluid conduits and the physical properties of the medium conveyed by the conduit be powered by passive RFID tags. Passive RFID tags collect energy from interrogating radio waves of nearby RFID readers. The passive RFID tag uses the collected energy to perform operations such as powering the sensor to obtaining real-time measurements from the fluid conduit. The measurements are then sent as data to an external RFID reader for display or further processing by the computing device. In this way, it is possible to provide an RFID sensor that does not require on-board power sources for operational power, such as for example a battery or other power supply and associated electrical conductors.

SUMMARY

This disclosure relates to a system that uses an RFID enabled sensor to sense a physical property of a medium inside a conduit and report the sensed physical property using an RFID communication protocol.

In a first embodiment, a system for sensing a physical property of a medium inside a conduit includes a radio frequency identification (RFID) reader arranged to transmit electromagnetic signals in at least one radio frequency. An RFID tag receives the least one radio frequency and exchanges the at least one radio frequency to electrical energy to power the RFID tag. A sensor electrically connected to the RFID tag and located adjacent the medium flowing inside the conduit receives the electrical energy from the RFID tag thereby operating the sensor to obtain measurement data of at least one physical property of the medium whereby the sensor transmits the measurement data to the RFID tag and the measurement data is transmitted by the RFID tag to the RFID reader using the at least one radio frequency.

In a second embodiment, a method for sensing a physical property of a medium inside a conduit includes transmitting electromagnetic signals in at least one radio frequency using a radio-frequency identification (RFID) protocol that is received by an RFID tag. The RFID tag exchanges the at least one radio frequency to electrical energy to power the RFID tag and a sensor located adjacent the medium flowing inside the conduit. The method further includes operating the sensor using the electrical energy to obtain measurement data of at least one physical property of the medium and transmitting the measurement data to the RFID tag whereby the RFID tag transmits the measurement data from by the RFID tag using the RFID protocol using the at least one radio frequency.

In a third embodiment a radio frequency identification (RFID) module for sensing a physical property of a medium inside a conduit includes a substrate mounted on the conduit adjacent the medium. An analog control circuit disposed on the substrate includes an ultra-high frequency (UHF) interface circuit and a high frequency (HF) interface circuit. A UHF antenna is formed on the substrate and electrically coupled to the UHF interface circuit and an HF antenna is formed on the substrate surrounding the UHF antenna and electrically coupled to the HF interface circuit. The module further includes a sensor located on the substrate and arranged to obtain measurement data of at least one physical property of the medium in the conduit and a radio frequency identification (RFID) tag, located on the substrate and electrically coupled to the analog control circuit and to the sensor.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which:

FIG. 4 illustrates a side sectional view of a multi-layered conduit having an RFID module mounted within the conduit and a separate antenna substrate mounted on an external surface of the conduit in accordance with the embodiments described herein;

FIG. 4A illustrates a top-view of the antenna substrate of FIG. 4 mounted to the external surface of the conduit in accordance with the embodiments described herein;

FIG. 5 illustrates a side elevational view of the RFID module mounted to the external surface of a single-layer conduit in accordance with the embodiments described herein; and FIG. 5A illustrates a top-view of the RFID module of FIG. 5 mounted on the external surface of a single-layer conduit in accordance with the embodiments described herein.

DETAILED DESCRIPTION

Figure 1:
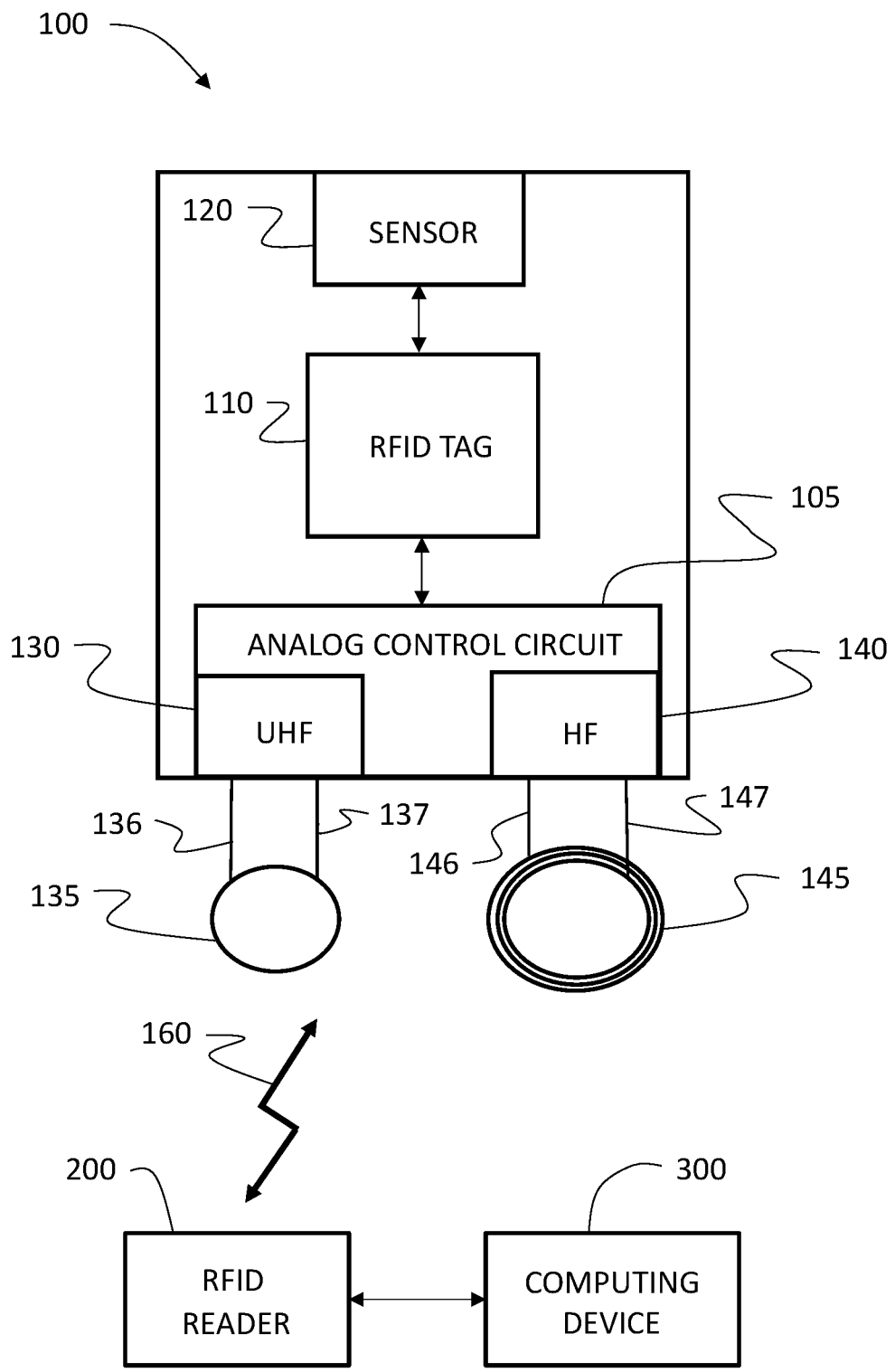
FIG. 1 illustrates an example block diagram of a radio frequency identification (RFID) module in accordance with the embodiments described herein.

The figures, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Within the meaning of this application, by the term "conduit" is meant a conduit, as well as conduit couplings and parts thereof used to convey a fluid medium, such as fuel, hydraulic fluid, oil, engine coolant fluid or air. The conduit usually takes the form of an elongated, cylindrical hollow body. At one or both of its ends, the conduit optionally has a conduit coupling or a part of a conduit coupling, a so-called fitting, by means of which the conduit can be connected to e.g., another conduit or other conduit units, such as a fixed pipe system or other parts of a pipe assembly.

In a preferred embodiment of the present disclosure, the conduit and the walls of the conduit are comprised of a thermoplastic material, such as by example and non-imitatively, polyamides (PA) or Polyolefins such as polyethylene (PE) or polypropylene (PP) or their co-polymers or polyvinylchloride (PVC). The conduit and the walls of the conduit may also be comprised of flexible compounds including both thermoplastic elastomers and thermoset rubbers. For example, thermoplastic elastomers such as dynamically vulcanized ethylene propylene diene-monomer (EPDM) such as Santoprene, Sarlink or other thermoplastics elastomers based on urethane (TPU), such as by example Laripur or Desmopan. Thermoset rubber compounds can be based on polydimethyl siloxane (PDMS) as well as materials based on EPDM rubber, chloroprene, Acrylate (ACM or AEM), Acrylonitrile-Butadiene (Nitrile) rubber or the like. Such thermoplastic conduits can for example be produced in such a way that the thermoplastic material or material layers are extruded directly into the form of the desired conduit. Furthermore, it is also possible that the conduit wall comprises several plies or layers of the thermoplastic material which are arranged one on top of another e.g., in the form of several film plies ("sandwich construction").

The embodiments described herein provide various designs of multi-frequency and single-frequency radio frequency identification (RFID) modules that are compact in size, can be portable and used in multiple applications. Certain embodiments of the multi-frequency RFID modules described herein can include, a passive RFID tag, a passive sensor and both a high frequency (HF) antenna subsystem and an ultra-high frequency (UHF) antenna subsystem. Additionally, in the embodiment described herein passive RFID tags do not have a power supply, such as for example a battery and require an electromagnetic field from an external source, such as for example, an RFID reader to harvest energy to power the tag. Similarly, the included passive sensor is not powered by a power supply and relies on the power provided to the RFID tag from the RFID reader to power the sensor.

As used herein the energy harvesting refers to a process of extracting and capturing electrical energy from an external source. In this embodiment, energy harvesting specifically refers to electromagnetic radio frequency (RF) energy harvesting, where an RF electromagnetic field is produced by a transmitter and captured by a tuned coil or electric field within a receiver from an antenna tuned to the frequency of the RF electromagnetic field.

Similarly, single-frequency RFID modules described herein can include, a passive RFID tag, a passive sensor and either a high frequency (HF) antenna subsystem or an ultra-high frequency (UHF) antenna subsystem. Additionally, the passive RFID tag of a single-frequency RFID module also does not require the use of a power supply, such as for example a battery and relies on the electromagnetic field from a external source, such as for example an RFID reader to the power the RFID tag. Similarly, the included passive sensor is not powered by a power supply and relies on the power provided to the RFID tag from the RFID reader to power the sensor.

The passive RFID tag, sensor and UHF and HF subsystems either individually or in combination, can share a common analog control circuit on an integrated circuit (IC) substrate. The HF subsystem connects to a spiral wound coil IF antenna and the UHF subsystem connects to a loop antenna electrically isolated from the HF coil antenna.

The RFID module can be configured to provide multiple operating frequencies in order to be used in a wider range of applications. For example, a multi-frequency RFID tag can support both high frequencies (e.g., 13.56 MHz) and ultra-high frequencies (e.g., 915 MHz) radio transmissions. Ultra-high frequency (UHF) radio transmission can typically provide for greater read distance than a high frequency (HF) RFID transmission. Meanwhile, HF RFID radio transmission tend to exhibit greater field penetration than the UHF RFID transmissions. In certain other embodiments, the UHF subsystem can simply comprise only the UHF subsystem and UHF loop antenna coupled to the analog control circuit.

Turning to FIG. 1 a block diagram illustrates a multi-frequency RFID module 100 of the present embodiment. The RFID module 100 may include an analog control circuit 105, a passive multi-frequency RFID tag 110 and a sensor 120. Analog control circuit 105 further includes a UHF subsystem comprised of a UHF interface circuit 130, and a loop antenna 135 electrically connected to the UHF interface circuit 130 via electrical conductors 136 and 137. The UHF subsystem is tuned to operate at a UHF radio frequency, for example of 915 MHz. The analog control circuit 105 may further include an HF subsystem comprised of an HF interface circuit 140 and an HF coil antenna 145 electrically connected to the HF interface circuit 140 via conductors 146 and 147. The HF subsystem is tuned to operate at a HF radio frequency for example, of 13.56 MHz.

As was mentioned earlier, the RFID module 100 in another embodiment can also be configured to operate at a single frequency. For example, in a single-frequency the RFID module 100 can include an analog control circuit 105, a passive single-frequency RFID tag 110 and a sensor 120. The analog control circuit 105 only includes, either an HF antenna subsystem and its associated components or alternately, a UHF antenna subsystem and its associated components. Each of the antenna subsystems include the individual components explained above for the multi-frequency RFID module 100.

The RFID module 100 containing the analog control circuit 105, the RFID tag 110, sensor 120, and antenna interface circuits are assembled together as, for example an integrated circuit (IC).

In the present embodiment, the analog control circuit of 105 of the multi-frequency RFID module 100 is considered frequency-independent. For example, a multi-frequency RFID tag 110 can be configured to interface with both the UHF and HF interface circuits 130 and 140. Thus, the analog control circuit 105 can perform functions associated with both the HF and UHF subsystems including, but not limited to, encoding/decoding, modulation/demodulation, digital and analog processing, and storage of identification data, such as for example the ID of the RFID module 100, its location and an identification of the conduit it is attached to. The ID information stored in the analog control circuit 105 can also be used to identify the ID of a particular one of an RFID module 100 in applications where more than one RFID module 100 is used. Such as for example in sensor supplication for detecting fluid leaks, wherein a plurality of RFID modules may be used to detect for leaks along the exterior of a long conduit at various locations. Although a multi-frequency RFID module can use a single analog control circuit 105 to operate with different frequencies, more than one analog control circuit 105 can be used to implement functions associated with multi-frequency RFID tags operating at different frequencies.

The sensor 120 of the RFID module may be configured to be any resistive type of sensor or transducer, including bridge devices, devices that generate voltage, such as piezoelectric sensors, thermocouples, thermoelectric generators and the like, capacitive sensors, pressure sensors, liquid leak sensors, and other such sensor or transducer types. Within the meaning of this application the sensor 120 is selected to sense a physical property from the group consisting of the temperature of the conduit wall, e.g. the temperature in the inside of the conduit wall or the temperature on the inner surface of the conduit wall, with the result that the temperature of the medium located in the conduit can be inferred; the positive or negative pressure, for example the strain acting on the conduit wall and the integrity of the conduit wall due to leakage of fluid from the conduit wall due to a break in the conduit wall or ageing of the material forming the conduit wall.

In this way, one or more physical properties of a medium flowing in a conduit can be detected, such as temperature, pressure, or breaks in the conduit wall that can cause fluid leaks. Because of the low power available from the RF source in passive RFID tags, it is most preferred to use high impedance sensors to reduce power consumption.

Figure 2:
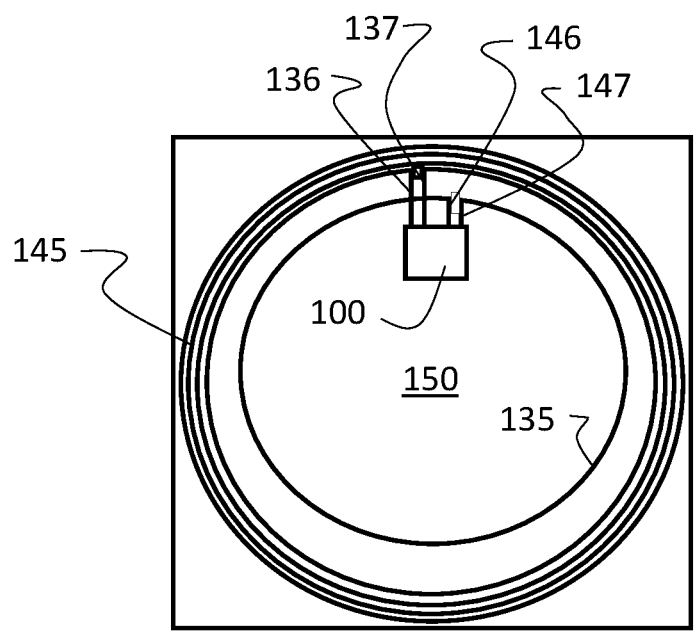
FIG. 2 illustrates a top-view of the RFID module mounted to a substrate in accordance with the embodiments described herein.

Turning now to FIG. 2, an embodiment of the RFID module 100 along with the UHF loop antenna 135 and HF coil antenna 145 is shown mounted on a suitable substrate 150. The RFID module 100 may also be assembled in other configurations with various combinations of components provided on separate interconnected substrates or in different locations. For example, the UHF loop antenna 135 may be mounted on a separate substrate from the substrate 150 and the HF antenna 145 coiled around a conduit exterior surface.

According to one exemplary embodiment. HF antenna 145 can be coupled to analog control circuit 100 using a bridging technique. In some embodiments. HF antenna 145 is constructed from etched aluminum. Hence, HF antenna 145 can be connected by crimping through layers (e.g., aluminum) of the HF antenna 145 to form conductors 146 and 147 electrically connecting antenna 145 to the HF interface circuit 140 of RFID module 100.

In another exemplary embodiment, both the UHF antenna 135 and HF antenna 145 can be coupled to the RFID module 100 by depositing (e.g., printing) dielectric and conductive inks on the substrate 150. For example, coils or loops that form antenna 145 can be constructed using conductive ink on substrate 150. The ends of the HF antenna 145 can be connected to the RFID module 100 using dielectric ink deposited over the inner coils to prevent short-circuiting while conductive ink can be deposited over the dielectric ink to create a jumper over the dielectric ink to connect the outer coils to the RFID module 100. UHF loop antenna 135 can also be formed using dielectric and conductive inks in the manner explained above and electrically coupled to the RFID module 100 vis printed conductors 136 and 137.

In the exemplary embodiment of FIG. 2, the UHF loop antenna 135 is shown positioned inside the HF coil antenna 120. In this nested configuration the substrate 150 containing the UHF antenna 135 and HF antennas 145, and multi-frequency RFID module 100 can be a physically compact module.

It will be well understood by those skilled in the art that the RFID module 100 can be mounted on substrate 150 with only one antenna subsystem. For example, a single-frequency RFID module 100 could be mounted to substrate 150 with either a UHF subsystem and its associated antenna 135 or a HF subsystem and its associated antenna 145.

Figure 3:
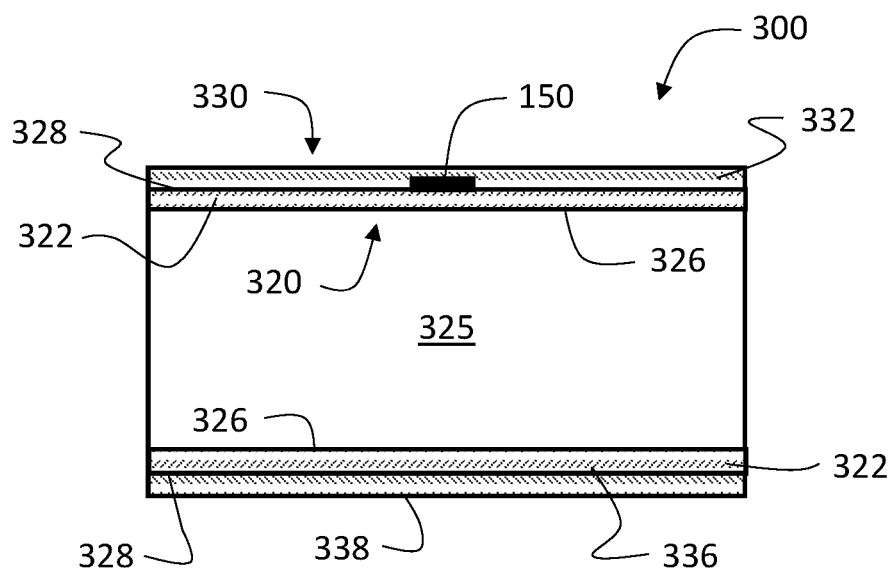
FIG. 3 illustrates a side sectional view of a multi-layered conduit having the RFID module mounted within the conduit in accordance with the embodiments described herein.

Turning now to FIG. 3 an exemplary conduit 300 of a preferred embodiment is illustrated. The conduit 300 takes the form of a first elongated, cylindrical tube 320 having an internal cavity 325 formed by an inner surface 326 and separated from an outer surface 328 by wall 322. Cavity 325 is arranged to have a fluid medium flow therethrough. In this exemplary embodiment a second tubular layer 330 having an inner surface 336 and separated from an outer surface 338 by wall 332. The inner surface 332 of the second layer 330 is overlayed over and integrally molded with the outer surface 328 of tube 320. The layer 330 is used to provide certain advantageous to the conduit 300, such as for example rigidity and or insulation. The tube 300 and the layer 330 can each be constructed from a thermoplastic material as a sandwiched multi-layered structure alternatively, the conduits 300 multi-layered structure can be constructed using a flexible rubber material, or a combination having the tube 320 constructed of a thermoplastic material and the layer 330 constructed of a rubber material.

The substrate 150 containing the RFID module 100 and antennas 130 and 140 is preferably mounted on outer surface 328 of tube 320. As can be seen in FIG. 3, the substrate 150 is mounted between tube 320 and layer 330 of conduit 300. The substrate 150 may be attached to surface 328 of tube 320 using an adhesive layer applied to either surface 328 or to the substrate 150 or alternately to both. The adhesive would be applied to the surface of substrate 150 opposite the surface where the RFID module 100 is mounted. Suitable adhesives include acrylic-based thermoset adhesives, such as DuPont PYRALUX LF or PYRALUX FR sheet adhesive or bond ply adhesive. Other adhesives for attaching the flexible substrate and sensor to the conduit may comprise flexible rubber adhesive with particle fillers, nano-fillers, or other fillers to further increase the modulus of elasticity of the adhesive.

In this configuration, the sensor 120 of RFID module 100 is positioned to provide sensor reading representing one or more physical properties of the fluid medium flowing in cavity 325, such as temperature, positive or negative pressure or strain, or fluid leaks that are applied by the fluid medium to surface 326 of and conveyed through wall 322. The sensor 120 of RFID module 100 is arranged to provide measurements of these physical properties conveyed through wall 322. Additionally, due to the RFID module 100 mounted between tube 320 and layer 330 the RFID module is protected against the ingress of dust particles, air, liquids and/or corrosive chemicals.

In certain other embodiments, the substrate 150 may include a modified RFID module 450 that does not include the UHF antenna 135 and HF antenna 145 mounted to the substrate 150. FIG. 4 and FIG. 4A illustrate an embodiment wherein a substrate 150 includes such a modified RFID module 450 adhesively mounted to surface 428 of a tube 420, however, antennas 135 and 145 are mounted on a separate antenna substrate 460. As can be seen in FIG. 4A, antenna substrate 460 without the RFID module 100 is mounted on the outer surface 438 of layer 430. In this embodiment, antennas 135 and 145 are formed on antenna substrate 460 and the substrate 460 adhesively attached to surface 438 of outer layer 430. Alternately, antennas 135 and 145 can be printed directly on surface 438 of layer 430 using conductive inks. In such an external mounting, the antennas 135 and 145 are electrically connected to their respective UHF and HF interfaces on the modified RFID module 450 via respective conductors 126 and 127 and 136 and 137 respectively, that penetrate the wall 432 of layer 430, electrically connecting the UHF antenna 135 and HF antenna 145 to the modified RFID module 450.

In this configuration, the sensor 120 of the modified RFID module 450 is positioned to provide reading of the physical properties of fluid medium in cavity 425 as was explained above for FIG. 3, however, due to the UHF and HF antennas being mounted on the outer surface 438 of layer 430 reception of the electromagnetic signals from an RFID reader and transmission of RFID signals from the antennas are in some instances stronger, favoring a more effective connection between the components of the RFID system.

According to another aspect of the present embodiment, a protective layer 470 of an insulating material, such as for example an epoxy resin can be deposited on surface 438 over the antenna substrate 460 or over the printed UHF 135 and HF 145 antennas, in order to protect the antennas from damage from external influences such as dust, liquids and corrosive materials and other damage that may be caused by road debris and any environmental or mechanical effects in the operation of a vehicle.

In another exemplary embodiment illustrated by FIG. 5 and FIG. 5A, the substrate 150 and RFID module 100 may be adhesively attached to the outer surface 528 of a single-layer conduit 500 or partially embedded on the exterior surface 528 of the conduit 500 such as placed in a pocket or void constructed on the conduit surface 528 (not shown). The conduit 500 of this exemplary embodiment takes the form of an elongated single-layer cylindrical tube having an internal cavity 525 formed by an inner surface 526 and separated from an outer surface 528 by a wall 522. Cavity 525 is arranged to have a fluid medium flow therethrough. The substrate 150 is attached to the external surface 528 of conduit 500 using an adhesive layer applied to either the surface 528 or to the substrate or alternately to both. The adhesive would be applied to the surface of substrate 150 opposite the surface where the RFID module 100 is mounted. Suitable adhesives include acrylic-based thermoset adhesives, such as described above, such as DuPont PYRALUX LF or PYRALUX FR sheet adhesive or bond ply adhesive. Other adhesives for attaching the flexible substrate and sensor to the conduit may comprise flexible rubber adhesive with particle fillers, nano-fillers, or other fillers to further increase the modulus of elasticity of the adhesive.

In this exemplary embodiment, the sensor 120 of RFID module 100 is positioned to provide sensor readings representing one or more physical properties of a fluid medium flowing in cavity 525 as was explained above in the description of FIG. 3.

According to one aspect of the present embodiment, the conduit can include a protective layer of insulating material 570, such as for example an epoxy resin deposited on the exterior surface 528 and applied over the substrate 150, in order to protect the RFID module 100 from damage from external influences such as dust, liquids and corrosive materials and other damage that may be caused by road debris and any environmental or mechanical effects in the operation of a vehicle.

With renewed reference to FIG. 1 an exemplary method for operating the RFID module 100 will now be explained. The RFID module 100 communicates with an actively powered RFID reader 200 via a wireless RFID protocol 160 using either a single or multi-frequency transmission system. The RFID module 100 is designed to communicate using either a UHF frequency, for example 915 MHz using the loop antenna 135 or an HF frequency, for example 13.56 MHz using coil antenna 145 or both simultaneously. The RFID reader 20) can operate and transmit RFID protocol transmissions at a UHF frequency of 915 MHz, or at an HF frequency of 13.56 MHz or both frequencies simultaneously. The components of the RFID module 100 work in concert with each other to take sensor measurements and also work in cooperation with each other to transmit sensor measurements from sensor 120 and stored ID information from analog interface circuit 105, to the RFID reader 200.

In operation, the RFID reader 200 transmits an inquiry signal via protocol 160 and also receives an authentication response from the RFID tag 110 of RFID module 100. Based on the frequency transmitted by reader 200, the RFID module 100 uses either the UHF antenna 135 or HF antenna 145 or both frequencies to receive the interrogation signal from the RFID reader 200 and to collect and harvest radio frequency (RF) energy transmitted by the reader 200 to power the RFID module 100.

The RFID module 100 uses the collected RF energy to power its components including the sensor 120. Sensor 120 uses the power collected from the RFID tag 110 to obtain real-time measurement data for a physical property from the fluid conduit. The measurement data is then transmitted to the RFID reader 200 via the RFID module 100 and antennas 135, 145 on the frequency used by RFID reader 200 to interrogate the RFID module 100. Additionally, the RFID module can also send ID information stored in the analog control circuit 105 along with the sensor 120 measurement data. The ID information can include the identification of the RFID module 100, a location of the RFID module 100, or other identifying information concerning the fluid conduit where the RFID module is installed. The RFID reader 200 can temporarily store the received measurement data from sensor 120 for further processing or transfer the measurement data directly to a computing device 300. The computing device 300 can use the measurement data received to calculate values, of the detected physical properties of the fluid medium such as for example a temperature or pressure. Or can perform post-processing evaluation on the measurement data or store the unprocessed data for further analysis.

The RFID reader 200 can be intermittently or continuously connect to one or more computing devices 300 such as a PC or data center. According to one exemplary embodiment, computing device 300 may not be tied to a particular device or processor and may be implemented by a cloud computing service or other distributed processing service. The connection between the RFID reader 200 and the computing device 300 may be a wireless connection such as WiFi or Bluetooth, or a hard-wired connection implemented according to a known IP protocol, for example via Ethernet or coaxial cable.

In another exemplary embodiment, the RFID reader 200 may perform some of the functions described herein as belonging to computing device 300, and vice versa. In fact, the RFID reader 200 and the computing device 300 may in some cases be implemented as a single unit or may be implemented as more than two units as described above. In this case, the functionality associated with either or both of these devices is distributed across two or more devices.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims is intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A system for sensing a physical property of a medium inside a conduit comprising:
   a radio frequency identification (RFID) reader arranged to transmit electromagnetic signals in at least one radio frequency;
   an ultra-high frequency (UHF) control circuit electrically connected to a UHF antenna tuned to receive a UHF radio frequency;
   a high-frequency (HF) control circuit electrically connected to an HF antenna tuned to receive an HF radio frequency;
   an RFID tag receiving the least one radio frequency exchanging the at least one radio frequency to electrical energy to power the RFID tag;
   a sensor electrically connected to the RFID tag located adjacent the medium flowing inside the conduit, the sensor receiving the electrical energy from the RFID tag and operating the sensor to obtain measurement data of at least one physical property of the medium; and the sensor transmitting the measurement data to the RFID tag, wherein the measurement data is transmitted by the RFID tag to the RFID reader using the at least one radio frequency.

2. The system of claim 1, wherein the system further includes an analog control circuit electrically connected to the RFID tag and to the ultra-high frequency (UHF) control circuit and to the high-frequency (HF) control circuit.

3. The system of claim 2, wherein the at least one radio frequency is a UHF radio frequency, and the UHF antenna is a loop antenna.

4. The system of claim 3, wherein the at least one radio frequency is an HF radio frequency, and the HF antenna is a coil antenna.

5. The system of claim 4, wherein the RFID tag, the sensor, the analog control circuit and UHF and HF control circuits are assembled together as an integrated circuit and mounted on a substrate to form a RFID module.

6. The system of claim 5, wherein the HF coil antenna and UHF loop antenna are mounted on the RFID module as a nested pair and electrically connected to a respective HF interface circuit and UHF interface circuit of the analog control circuit and mounted on a conduit wall adjacent the medium flowing in the conduit.

7. The system of claim 5, wherein the HF coil antenna and UHF loop antenna are mounted on an exterior surface of the conduit wall separate from the RFID module, the UHF and HF antenna electrically connected to a respective HF interface circuit and UHF interface circuit of the analog control circuit.

8. The system of claim 5, wherein the analog interface circuit further includes stored identification data, identifying the RFID module, the identification data transmitted to the RFID reader along with the measurement data.

9. The system of claim 1, wherein the sensor arranged to sense a physical property of a medium inside the conduit and acting on a conduit wall consisting of:
the temperature of the conduit wall;
the positive or negative pressure or strain acting on the conduit wall; and
the integrity of the conduit wall due to a break in the conduit wall.

10. A method for sensing a physical property of a medium inside a conduit the method comprising:
transmitting electromagnetic signals in at least one radio frequency using a radio-frequency identification (RFID) protocol;
providing an ultra-high frequency (UHF) control circuit electrically connected to a UHF antenna tuned to receive a UHF radio frequency;
providing a high-frequency (HF) control circuit electrically connected to an HF antenna tuned to receive an HF radio frequency;
receiving by an RFID the at least one radio frequency;
exchanging by the RFID tag the at least one radio frequency to electrical energy to power the RFID tag and a sensor located adjacent the medium flowing inside the conduit;
operating the sensor using the electrical energy to obtain measurement data of at least one physical property of the medium;
transmitting the measurement data to the RFID tag, and transmitting the measurement data from by the RFID tag using the RFID protocol and the at least one radio frequency.

11. The method of claim 10, wherein an analog control circuit is electrically connected to the RFID tag, the method further comprising:
electrically connecting the UHF control circuit to the analog control circuit; and
electrically connecting the HF control circuit to the analog control circuit.

12. The method of claim 11, wherein the transmission of the at least one radio frequency comprises a UHF radio frequency; and
the UHF antenna comprises a loop antenna.

13. The method of claim 12, wherein the transmission of the at least one radio frequency comprises an HF radio frequency; and
the HF antenna comprises a coil antenna.

14. The method of claim 11, wherein the transmission of the measurement data includes RFID identification data (ID) stored in the analog control circuit.

15. The method of claim 14, wherein the stored ID data comprises at least one of:
the identifying information of the RFID tag;
the location of the RFID tag; and
identifying information of the fluid conduit where the RFID tag is installed.

16. The method of claim 10, wherein obtaining measurement data of at least one physical property of the medium comprises:
sensing a physical property of a medium inside the conduit acting on a conduit wall including at least one of:
the temperature of the conduit wall;
the positive or negative pressure or strain acting on the conduit wall; and
the integrity of the conduit wall due to a break in the conduit wall.

17. The method of claim 11, wherein the transmission of electromagnetic signals in at least one radio frequency comprises:
using a remotely located RFID reader to transmit the RFID protocol interrogation signal in at least one of a UHF frequency or a HF frequency.

18. The method of claim 17, wherein the RFID reader transmits the RFID protocol signal in both a UHF frequency and HF frequency simultaneously.

19. The method of claim 17, wherein the RFID reader receives the measurement data from by the RFID tag using the RFID protocol and the at least one of the UHF frequency or HF frequency and the RFID reader transmits the measurement data to a computing device communicatively connected to the RFID reader, the computing device performing at least one of:
calculating values for the measurement data received from the RFID tag for a physical property of the medium in the conduit;
performing post-processing evaluation on the measurement data; and
storing unprocessed measurement data for further analysis.

20. A radio frequency identification (RFID) module for sensing a physical property of a medium inside a conduit comprising:
a substrate mounted on the conduit adjacent the medium;
an analog control circuit disposed on the substrate including an ultra-high frequency (UHF) interface circuit and a high frequency (HF) interface circuit;
a UHF antenna formed on the substrate and electrically coupled to the UHF interface circuit;

an HF antenna formed on the substrate surrounding the UHF antenna and electrically coupled to the HF interface circuit;
a sensor located on the substrate arranged to obtain measurement data of at least one physical property of the medium; and
a radio frequency identification (RFID) tag, located on the substrate and electrically coupled to the analog control circuit and to the sensor.

* * * * *